Figure 3:
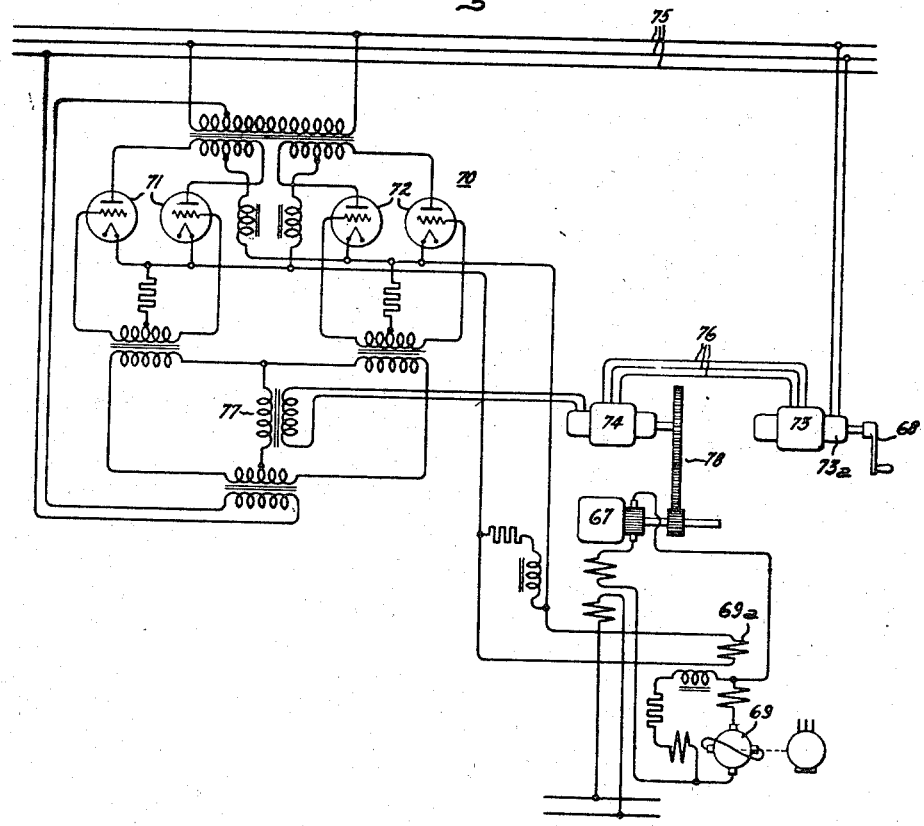

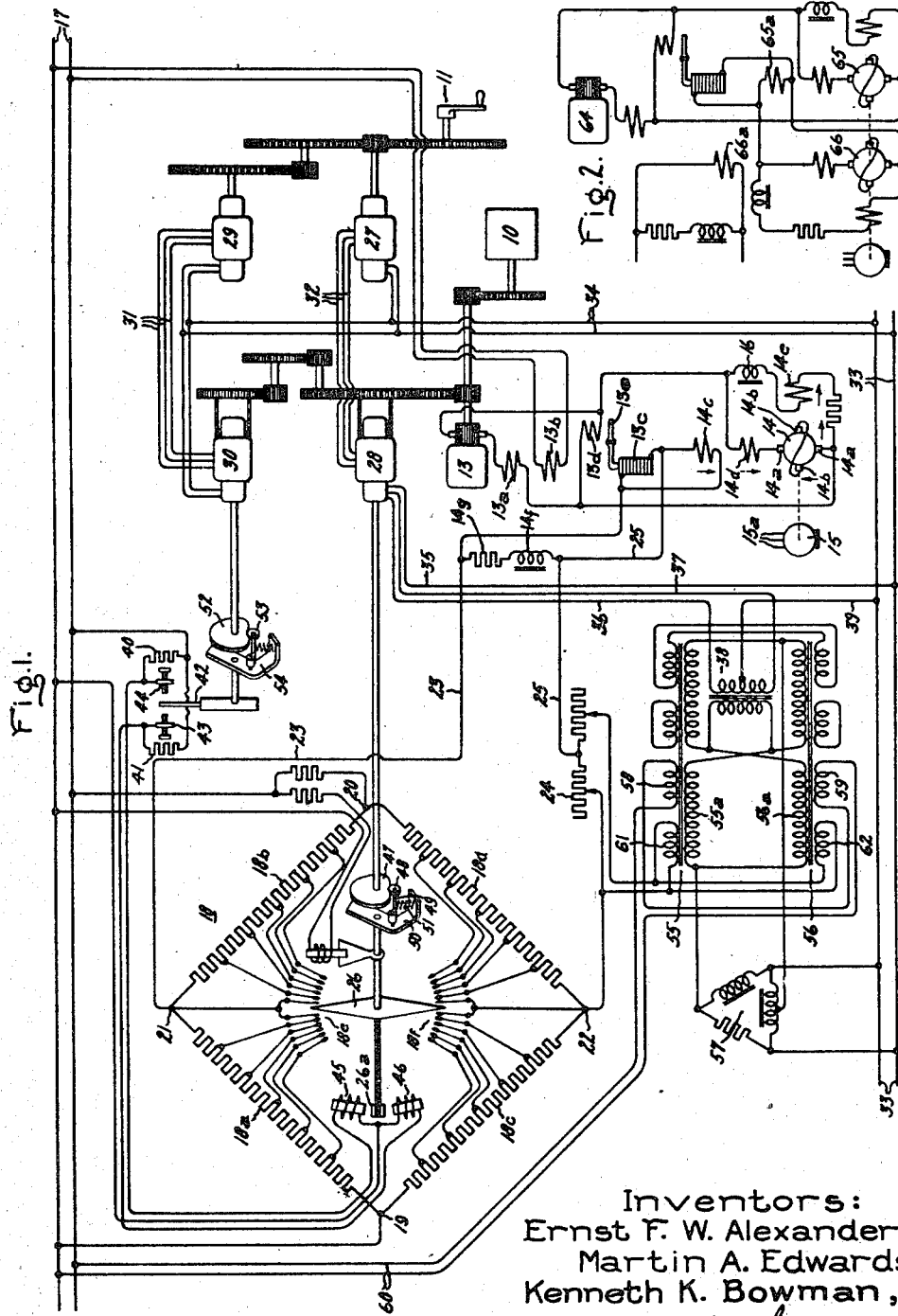

Patented Jan. 21, 1947

2,414,685

UNITED STATES PATENT OFFICE 2,414,685

FOLLOW-UP CONTROL SYSTEM

Ernst F. W. Alexanderson and Martin A. Edwards, Schenectady, and Kenneth K. Bowman, Scotia, N. Y., assignors to General Electric Company, a corporation of New York Application January 21, 1939, Serial No. 252,168

13 Claims. (Cl. 172—239)

This invention relates to control systems, more particularly to follow-up control systems, or torque amplifying systems, in which a driven object is caused to follow the movements of a pilot device so as to reproduce the positions and movements of the pilot device, and an object of the invention is the provision of a simple, reliable, and improved control system of this character.

More specifically, the invention relates to follow-up systems in which the driven object is driven by an electric motor and in which a high degree of accuracy of correspondence between the driven object and pilot device is required. Heretofore, follow-up systems have been utilized in which the motor was supplied from electric valves. Although such systems possess a sufficiently high degree of accuracy, they have other limitations, and there are many applications in which it is desirable that means other than electric valves, e. g., dynamo-electric machines, be utilized for supplying current to the driving motor. However, dynamo-electric machines have windings that contain inductance and inductance causes delayed or lagging currents. The result of this, especially in a follow-up system having several stages of amplification, is that the restoring force of the driving motor is still active when the driven object reaches correspondence with the pilot device, and this produces generation of self-excited mechanical oscillations usually referred to as "hunting." Accordingly, a further object of this invention is the provision of a follow-up control system in which the driving motor is supplied from a dynamo-electric machine and in which means are provided for eliminating hunting without sacrificing sensitivity of the system.

In carrying the invention into effect in one form thereof, the driving motor is supplied from an armature excited dynamo-electric machine having a control field winding, a pair of load brushes arranged to commutate on the axis of the control field winding and connected to the driving motor, and a pair of short-circuited brushes arranged to commutate on an axis at an angle with the control axis. Means responsive to positional disagreement of the pilot device and driven object are provided for causing a control current to be supplied to the control winding so that the driving motor is caused to drive the driven object towards correspondence with the pilot device.

In a specific embodiment of the invention, a plurality of stages of amplification are utilized, one of which is a dynamo-electric machine of the character described in the foregoing, and means are provided in each stage for counteracting the lag between input and output so as to eliminate hunting.

For a better and more complete understanding of the invention, reference should now be had to the following specification and to the accompanying drawings in which Fig. 1 is a simple, diagrammatical representation of an embodiment of the invention, and Figs. 2 and 3 are simple, diagrammatical representations of modifications.

Referring now to the drawings, an object 10 is to be driven in accurate correspondence with a pilot device 11. The driven object 10 may be any suitable driven object and pilot device 11 may be any suitable control device. Accordingly, the driven object 10 is illustrated conventionally in the drawings, and the pilot device 11 is illustrated as a shaft rotated by a handle. As an example, the driven object 10 may be the tool carrier of a machine tool, and the pilot device 11 may be a "feeler" which is moved along over a templet the contour of which is to be duplicated on the work piece by the tool.

Object 10 is driven by any suitable driving means such as represented in the drawings by the direct-current electric motor 13 to the drive shaft of which it is suitably connected. As shown, motor 13 is of the direct-current type and is supplied with power from an armature excited dynamo-electric machine 14. Dynamo-electric machine 14, in turn, is driven by any suitable driving means such as an induction motor 15 supplied from a suitable source represented by the three supply lines 15a.

The dynamo-electric machine 14 has two sets of brushes per pair of poles. Since the machine 14 as illustrated has but two sets of brushes, the machine 14 will therefore be a two-pole machine. One set of brushes 14a is connected to its load, i. e., the armature of the driving motor 13, and the other set of brushes 14b is short-circuited. The two mutually perpendicular brush axes are known as the control axis and the short-circuit axis respectively. The flux along the control axis is produced by a control field winding 14c, the series compensating field winding 14d, and the armature reaction of the load current. These fluxes act in the directions indicated by arrows in Fig. 1. The flux along the short-circuit axis is produced by the shunt field winding 14e and the armature reaction of the short-circuit current. The short-circuit axis flux generates the voltage which appears across the load brushes 14a, and the control axis flux produces the voltage which appears across the short-circuited brushes 14b and causes short-circuit current to flow. Machine 14 is preferably driven at a speed which is substantially constant.

The operation of dynamo-electric machine 14 will best be understood by considering the operation without a shunt and compensating field 14e, 14d and then subsequently considering the effect of the shunt field and the compensating field. Voltage is applied to the control field winding 14c and current begins to build up in it. Immediately there is generated a voltage in the short-circuit path which circulates a large current in the short circuit. The armature reaction flux produced by this current generates voltage across the load brushes 14a and causes load current to flow. But the armature reaction of the load current opposes the control field and the system quickly comes to equilibrium with just enough resultant flux along the control axis to keep current flowing through the low resistance short-circuit path. Any subsequent change in the armature current will cause relatively large changes in the short-circuit current and will be stubbornly resisted by the machine up to its saturation point. Therefore the load current is almost independent of load voltage and can be increased or decreased only by changing the ampere turns in the control field.

During transient conditions, the increasing armature current induces a voltage in the control field 14c which decreases its apparent inductance and makes the field current build up rapidly. However, since any difference between the field and armature ampere turns along the control axis produces a large short-circuit current, the armature current is forced to increase almost simultaneously with the field current. The result is unusually rapid response.

The function of the shunt field is to reduce the steady-state short-circuit current. For any given voltage across the load brushes 14a, there must be a corresponding flux on the short-circuit axis. If part of this flux is produced by a shunt field winding, the amount of flux which must be produced by the short-circuit armature current will be correspondingly reduced. For example, if the shunt field is adjusted to give excitation enough to generate nine-tenths of the voltage across the load brushes 14a, the short-circuit current for any given load voltage will only be one-tenth as great as it would be if there were no shunt field.

The series compensating field is used principally to reduce the control power. It is connected so that the series field ampere turns oppose the armature reaction ampere turns along the control axis and leave only a small residual to be overcome by the control field. In this way the power amplification is increased many times.

The flux linkages of the shunt field winding 14e of machine 14 must be changed in order to change the load voltage appearing across the brushes 14a. Accordingly, this field slows down the response of the machine very considerably. Also the current in the short-circuited winding of the rotor will, during the transient, build up rapidly in an attempt to change the voltage appearing at the load brushes 14a. However, the flywheel effect imposed by the shunt field winding opposing this change causes a large value of current to be built up in the short-circuited rotor winding, and the duration of the transient may be several seconds. The net result is that the rate of response is slowed down greatly and the machine would generate abnormally high currents in the short-circuited rotor winding, which would be highly undesirable.

In order to overcome this difficulty, a suitable energy storage device, illustrated as an inductance 16 is connected in series relationship with the shunt field winding 14e. This inductance should not be coupled with the rotor circuit, and for this reason it is illustrated external to the machine itself. It will be understood, however, that the inductance could be built into the machine if desired. The effect of the inductance 16 in circuit with the shunt field winding 14c is to reduce the coupling between the shunt field winding and the rotor winding. The invention obviously includes any other suitable means for reducing the coupling between the shunt field winding and the rotor winding.

The predominant characteristics of machine 14 are rapid response, and low ratio of control watts to load watts, e. g. an amplification as high as 25,000:1. Its behavior is based primarily on the fact that the short-circuit path tends to maintain zero net ampere turns along the control axis at all times.

Driving motor 13 is provided with a series compensating field winding 13a and a shunt field winding 13b that is supplied from a suitable source of excitation represented by the two supply lines 17.

Suitable means are provided for limiting the speed of the drive motor 13 to a safe maximum value. These means are illustrated as a pressure responsive variable resistor 13c connected in parallel with the control field winding 14c, a solenoid 13d connected across the terminals of machine 14 so as to be responsive to the voltage supplied to motor 13, and a member 13e controlled by the solenoid for applying pressure to the variable resistor. The speed of motor 13 is proportional to the applied voltage.

In operation when the speed of motor 13 exceeds a predetermined value, the solenoid 13d attracts the member 13e and applies a pressure to variable resistor 13c to reduce its resistance. This results in weakening the control field of machine 14 and decreasing the voltage of machine 14, which in turn reduces the speed of the motor 13. This speed limiting means may be designed or made adjustable to limit the speed of motor to any desired value.

The supply of control current to the control field winding 14c of machine 14 is controlled by suitable means illustrated as a Wheatstone bridge 18. As indicated in the drawings, the upper side of the bridge 18 comprises resistance arms 18a and 18b, and the lower side of the bridge comprises resistance arms 18c and 18d. The diagonally opposite points 19 and 20 of the bridge are connected to opposite sides of the source 17, and the other two diagonally opposite bridge points 21 and 22 are connected to the terminals of control field winding 14c. Bridge point 21 is connected to one terminal of field winding 14c through conductor 23, and the diagonally opposite bridge point 22 is connected through resistance 24 and conductor 25 to the opposite terminal of the field winding 14c.

When bridge 18 is balanced, the voltages of the diagonally opposite bridge points 21 and 22 are equal and no current is supplied to the control field winding 14c, and as a result, no voltage is generated by the machine 14 and the motor 13 is, therefore, at standstill.

Suitable means, illustrated as a pivotally mounted rocker arm 26, are provided for controlling the balance of the bridge, and means responsive to positional disagreement of the pilot device 11 and the driven object 10 are provided for actuating the rocker arm 26. These means are shown as high and low speed self-synchronous electrical motion transmission systems. The high speed motion transmission system comprises an electrical motion transmitting device 27 and an electrical motion receiving device 28, and similarly the low speed electrical motion transmission system comprises a transmitting device 29 and a receiving device 30. The rotor member of the transmitting device 27 is connected to the pilot device 11 so as to rotate at a suitable high speed ratio, e. g., 36:1 with respect to the pilot device 11, while the rotor of the transmitting device 29 is preferably driven in a 1:1 ratio with respect to the pilot device. Thus, for each degree of rotation of the pilot device 11, the rotor of the high speed transmitting device 27 rotates 36 degrees and consequently, a very fine and accurate control is obtained.

The arms 18a, 18b, 18c, and 18d of the Wheatstone bridge are preferably resistors, and each of these arms is provided with a plurality of taps, as shown. Each tap in turn is provided with a flexible contact, preferably a resilient heat tempered spring contact. Contacts for the two arms 18a and 18b comprising the upper side of the bridge are arranged in a row 18e, and similarly, the spring contacts for the arms 18c and 18d constituting the lower side of the bridge are arranged in a row 18f spaced from the upper row. Each contact is initially adjustable so that it is spaced from its neighboring contact when both are undeflected.

When the rocker arm 26 is in the central or null position in which it is shown, all of the spring contacts are in their undeflected positions and the bridge is balanced so that no voltage is supplied to the motor 13. If the rocker arm 26 is rotated in a counterclockwise direction, it engages the first spring contact for the arm 18a and also the first spring contact for the arm 18d. As the rotation of the arm 26 continues, the first contacts of arms 18a and 18d are deflected into engagement with the second contacts of the arms 18a and 18d, thereby short-circuiting a portion of the resistance of each of the arms. If the rotation of the rocker arm 26 is continued to its extreme counterclockwise position, the second contacts of each of the arms will be forced into engagement with the third contact, etc., and thus the individual portions of the resistance arms 18a and 18d will be successively short-circuited until the entire arms are short-circuited. This of course produces maximum unbalance of the bridge, and maximum voltage is impressed on the terminals of the control field winding 14c with the result that maximum voltage is supplied to the armature of motor 13. Similarly, clockwise rotation of the rocker arm 26 produces successive short circuiting of the opposite bridge arms 18b and 18c until in the extreme clockwise position of the rocker arm, the arms 18b and 18c are completely short-circuited, maximum unbalance of the bridge is obtained, and maximum voltage of reverse polarity is impressed on the control field winding 14c, and likewise maximum voltage of reverse polarity is supplied to the motor 13 so as to cause it to rotate in the reverse direction.

Although the transmitting and receiving instruments 27, 28, 29, and 30 may be of any suitable type, they are preferably alternating-current type instruments, and each instrument is provided with a poly-circuit armature winding and with a field winding. Transmitters 27 and 29 are provided with field windings (not shown) on their rotor members and with three-phase armature windings (not shown) on their stator members. The receiver 30 is similar in construction and circuit arrangement to the transmitters 27 and 29. Corresponding points of the armature windings of transmitter 29 and receiver 30 are connected together by means of conductors 31, and similarly corresponding points of the armature windings of transmitter 27 and receiver 28 are connected together by means of conductors 32. The field windings of transmitters 27 and 29 and receiver 30 are single-phase windings and are supplied with alternating current from a suitable source such as that represented by the supply lines 33 to which these windings are connected by means of conductors 34.

The rotor member of the high speed receiving device 28 differs from the rotor member of the low speed receiving device 30 in that it is provided with a poly-circuit distributed field winding (not shown). This winding is preferably a delta-connected winding and one of the delta points is connected by means of a conductor 35 to one side of the alternating-current source 33. The other two delta points of this winding are connected by means of conductors 36 and 37 to the terminals of the secondary winding of a transformer 38. The midpoint of this transformer secondary winding is connected by means of conductor 39 to the opposite side of the alternating current source 33.

Resistors 40 and 41 are connected across movable contact 42 and stationary contacts 43 and 44 respectively of a switching device that is associated with the low speed motion transmission system so that a definite amount of current always flows from the source 17 through the operating coils of electromagnets 45 and 46.

In the central position in which the armature 26a is illustrated, it is unaffected by the electromagnets 45 and 46. However, when the armature is displaced from its zero position toward one of the electromagnets, the pull of the two electromagnets on the armature becomes unequal. The pull of the electromagnet which the armature is approaching will increase and the pull of the other will decrease. This increasing pull builds up in a parabolic relationship with respect to the distance between the armature and the electromagnet.

The rotor member of the high speed receiving device 28 is connected to the contact rocker arm 26 through a yieldable coupling comprising a heart-shaped cam 47 with which a spring pressed roller 48 cooperates. As shown, the cam 47 is mounted on the rotor shaft of receiving device 28, and the roller 48 is carried on the end of an arm 49 which is pivotally mounted on a support 50. Bearing against the arm 49 is a helical spring 51 which forces the arm toward the cam surface of the cam and thereby maintains the roller in engagement therewith. The heart cam is constructed and arranged on its shaft in such a manner that the roller 48 is caused by the spring 51 to seek a position of rest at the base of the cam, as shown in the drawings. The frame 50 is directly connected to the rocker arm 26 as indicated.

Thus it will be seen that a limited rotation of the cam 47 in either direction from the central or off position in which it is shown will produce a rotation of the rocker arm 26 in a corresponding direction. However, if the rocker arm 26 is actuated to an extreme position, the cam 47 can continue its rotation although the rocker arm 26 remains held in its extreme position.

The contact rocker arm 26 is provided with an armature member 26a arranged between the two solenoids 45, 46. The selector switch comprising movable contact member 42 and stationary contacts 43, 44 provides selective energization of the solenoids 45, 46. The movable contact member 42 of this selector switch is connected to the rotor of the low speed receiving device 30 through the yielding connection comprising the heart cam 52, spring pressed roller 53, together with its carrying frame 54. This heart cam mechanism is identical with the heart cam mechanism 47, 48, 49, 50, 51 described in the foregoing.

As shown, the stator members of the receiving devices 30 and 28 are rotatably mounted and are geared to the shaft of the drive motor 13 and hence are connected to the driven object 10. The ratio of the gearing between the load 10 and the stator member of the high speed receiving device 28 is the same as the ratio of the gearing between the pilot device 11 and the rotor member of the high speed transmitting device 27, which in this particular case has been assumed to be 36:1. Similarly, the ratio of the gearing between the load 10 and the stator member of the low speed receiving device 30 is the same as the ratio of the gearing between the pilot device 11 and the rotor of the low speed transmitting device 29 which has been assumed to be 1:1.

Electrical motion transmitting and receiving devices connected and energized in the manner described for the instruments 27, 28, 29, 30 have the property of self-synchronism. In other words, if the stator member of the receiving device 28 is restrained and the rotor member of the transmitting device 27 is turned from its original position with respect to its stator winding, the rotor member of the receiving device will turn a corresponding amount to a corresponding position. Thus, if the rotor member of the transmitter 27 is rotated a given angle, e. g., ten degrees in a clockwise direction and the stator member of the receiver 28 is restrained, the rotor member of the receiver will rotate ten degrees in a clockwise direction and the rotor members of both devices will again be in positions of correspondence with respect to their stator windings. It will also be noted that if the rotor member of receiver 28 remains at rest and the stator member is rotated ten degrees in a counterclockwise direction while the rotor member of the transmitting device is being rotated ten degrees in a clockwise direction, the rotor member of the receiver will be in the same position with respect to its stator, as if it had rotated in a clockwise direction and the stator member had remained at rest. In other words, if the stator member of the receiver is rotated in a direction opposite to that in which the rotor member tends to rotate and at the same speed as that at which the rotor of the transmitter rotates, the rotor member of the receiver will remain standing still in space. This is also true of the transmitting and receiving devices 29 and 30. When the driven object 10 is in correspondence, i. e., in positional agreement with the pilot device 11, the rotors and stators of the transmitting and receiving devices 27 to 30 inclusive, are in the positions in which they are illustrated in the drawings.

In order to prevent transient oscillations or hunting, an anti-hunting device is provided, comprising two saturable core reactors 55, 56. The alternating-current windings 55a and 56a of these reactors are connected in parallel to form a bridge as shown, and are supplied from a suitable source of alternating voltage represented by the two supply lines 33 to which the alternating-current windings 55a and 56a are connected through a phase compensating network 57. Reactors 55 and 56 are provided with direct-current magnetization control windings 58 and 59 which are connected in series relationship as indicated and are supplied from a suitable source represented by the two supply lines 17 to which they are connected by means of conductors 60.

Reactors 55 and 56 are also provided with direct-current control windings 61 and 62 which are connected in parallel relationship with each other across a portion of resistor 24 so that they are energized in accordance with the control current supplied from the bridge 18 to the control field winding 14c of dynamo-electric machine 14.

When no current is flowing in the circuit of the control field winding 14c and consequently no current is flowing in the direct-current coils 61, 62, the bridge formed by the alternating-current windings 55a, 56a is balanced and no voltage is supplied to the primary winding of the transformer 38. If a control current is flowing in the circuit of the control field winding 14c, this bridge is unbalanced in one direction or the other and a voltage is supplied to the primary winding of the transformer 38, and this voltage is supplied through the transformer to the rotor winding of the receiver 28 in such a direction that a torque is produced which causes the rotor member of the receiver to turn in a direction which rotates the rocker arm 26 in a direction to reduce the current being supplied to the field winding 14c. Stated in other words, the voltage supplied through the transformer 38 to the rotor winding of the receiver 28 shifts the axis of the rotor flux of the receiver 28 in such a direction that the axes of the rotor and stator fluxes coincide before the driven object reaches a position of correspondence with the pilot device and as a result, the control is caused to function as it functions when correspondence is reached, but before this condition actually occurs.

Thus it will be noted that the follow-up system as explained in the foregoing comprises a plurality of stages of amplification. The first stage is illustrated as a resistance bridge 18, but this of course might be replaced by a suitable electric valve type amplifier as shown in Fig. 3. The saturable reactor network 55, 56 produces a leading phase displacement of the voltage output of the bridge 18 with respect to the error of the system as explained in the foregoing.

The second stage of amplification is the control field winding 14c of the armature excited dynamo-electric machine 14. The current in this winding of course tends to be lagging because of its inductance and this current is given a leading phase displacement by means of an energy storage device illustrated as a reactive shunt comprising the inductive reactance $14_r$ and a resistor $14_g$ connected in series relationship with each other and in parallel with the field winding 14c. This invention also obviously includes the use of any other suitable means for advancing the phase relationship of changes in current flowing in the control field winding 14c with respect to changes in the output voltage of the bridge 18.

The third stage of amplification is the power circuit comprising the armatures of the armature excited dynamo-electric machine 14 and the driving motor 13. The current in this power circuit tends to become lagging because in direct-current machines of normal design, the inductance is large in comparison with the resistance.

The system also has a tendency to oscillate or hunt even if the first stages are well designed. It is usually possible to overcome the tendency to oscillate by making the control less sensitive, or by introducing resistance in the armature circuit of the machines 13, 14. This, however, defeats the object of a high degree of accuracy. Accordingly, this tendency of the power circuit to oscillate must be overcome by other means.

A freely oscillating direct-current armature in a low frequency circuit acts as a condenser of relatively large capacity. The energy is stored in mechanical inertia instead of in a dielectric field. Thus, the armature of the motor 13 with its connected load represents an electromechanical capacitance. The condition for changing current changes from lagging to leading with respect to voltage changes is that the electromechanical capacitance shall be greater than the electromagnetic reactance of the circuit at the frequency at which the system tends to oscillate. This relationship can be calculated quantitatively by calculating the natural period of the system from the inertia and the synchronizing force and then calculating the electromechanical capacitance and electromagnetic reactance for that frequency. This relationship can also be obtained by considering the electromagnetic inductance and the restoring force.

If the load, i. e., the driven object is moved by mechanical force from its point of correspondence until the motor exerts a torque equal to full load torque, mechanical energy is consumed in this motion, and magnetic energy is stored in the inductance of the field windings. The criterion that the electromechanical capacitative reactance shall fully neutralize the electromagnetic reactance is that the energy consumed in the mechanical motion shall be at least as great as the energy stored in the electromagnetic field.

The more sensitive the control is made the smaller is the angle through which the load may be moved before the motor exerts full load torque, and therefore, the smaller will be the mechanical energy consumed by that motion. The electromagnetic energy is, on the other hand, always the same at full load torque regardless of the sensitivity of the control. Thus, the magnetic energy may be calculated from the dimensions of the direct-current armature, and it is possible to determine how great a sensitivity of control may be used without resulting in oscillations. The limiting condition for maximum sensitivity without oscillations occurs when the mechanical energy used up in forcing the load out of correspondence is equal to the magnetic energy of the circuit inductance. It also follows that the smaller the amount of magnetic energy stored in the armature circuit at full load torque, the greater is the sensitivity or increase of accuracy of correspondence that may be realized.

In the present system the inductance of the power circuit is minimized by the series compensating windings on the armature excited dynamo-electric machine 14 and the driving motor 13.

With the foregoing understanding of the elements and their arrangement and connection in the system, the operation of the system itself will readily be understood from the following detailed description.

Assuming the system to be at rest and further assuming the driven object 10 to be in positional agreement, i. e., correspondence with the pilot device 11, the apparatus will be in the condition in which it is illustrated in the drawings. The pilot device 11 is rotated, either manually or in response to some variable in accordance with which it is desired to rotate the driven object 10. This produces rotation of the rotors of the transmitters 27 and 29. The rotor of transmitter 27 rotates 36 degrees for each degree of rotation of the pilot device, and the rotor of the transmitter 29 rotates one degree for each degree of rotation of the pilot device. Since the motor 13 and the driven object 10 are at rest when the pilot device 11 is first moved, the stator members of the receivers 28 and 30 are restrained against movement and consequently the rotors of the receivers rotate in correspondence with the rotors of their respective transmitters. Assuming clockwise rotation of the rotor members of the transmitters, the rotors of the receivers will also rotate in a clockwise direction. Clockwise rotation of the rotor of the receiver 28 will produce clockwise rotation of the cam 47 and also clockwise rotation of the contact rocker arm 26. As set forth in the foregoing, clockwise rotation of the rocker arm 26 will successively short-circuit portions of the arms 18b, 18c of the bridge 18, and thus, produce an unbalance of the bridge so that a voltage is impressed on the control field winding 14c of the armature excited dynamo-electric machine 14, which will cause a control current to flow in the control field winding 14c. As a result a greatly amplified current will be supplied from the load brushes 14a of the machine 14 to the armature of the driving motor 13. This will cause the motor 13 to rotate in a direction to drive the driven object 10 into correspondence with the pilot device. The gearing between the motor 13 and the stator members of the receivers 28 and 30 is so arranged that the stator members are rotated in a direction opposite to that in which the rotors are rotated. The motor 13 accelerates rapidly and when its speed has increased to the value at which the counterclockwise speed of the stator member of the receiver 28 is equal to the clockwise speed of the rotor member of the transmitter, the rotor member of the receiver 28 will come to rest in space. At this point the rotor member of the receiver is rotated from its initial position by an amount necessary to deflect the rocker arm 26 to a position to produce an unbalance of the bridge and a control current in the circuit of the control field winding 14c sufficient to cause the motor 13 to drive the driven object 10 at a speed equal to the speed at which the pilot device 11 is rotating. The rotor member of the receiver 30 is rotated a proportional amount, i. e., one thirty-sixth of the rotation of the receiver 28. If the speed of the pilot device is further increased, the rotor members of the receivers 28 and 30 will rotate in a clockwise direction thereby causing more of the flexible contacts to be short-circuited by the rocker arm 26 and the speed of the motor 13 and the driven object 10 to be correspondingly increased. When the speed of the driven object 10 becomes equal to that of the pilot device 11, the stator members of the receivers 28 and 30 will be driven in a counterclockwise direction at the same speeds as that at which the rotors of the transmitters 27 and 29 are being driven in a clockwise direction, and consequently, the rotors of the receivers 28 and 30 will again come to rest.

If the speed of the pilot device 11 is increased to the maximum speed at which the motor 13 can drive the driven object 10, the rocker arm 26 will be in its extreme clockwise position in which all of the portions of the bridge arms 18b and 18c are short-circuited, and the rotors of the receivers 28 and 30 will again come to rest. The rotor of receiver 28 will be rotated from its initial position sufficiently to cause the rocker arm 26 to be maintained in its extreme clockwise position. This produces maximum unbalance of the bridge, and maximum power will be supplied to the motor 13 causing it to rotate the driven object 10 at its maximum speed. Under these conditions the armature 26a attached to the rocker arm 26 will be in proximity or in engagement with the core of the solenoids 45. However, if the speed of the pilot device 11 is further increased, the rotors of the receivers 28 and 30 will begin to rotate, and since the speed of the motor 13 cannot be further increased, the rotors of the receivers will continue to rotate as long as the pilot device 11 is rotated at this increased speed. The heart cams 47 and 52 permit this continuous rotation. As soon as heart cam 52 has rotated a small amount, depending upon the setting of the contacts 43, 44, the movable contact member 42 will engage the stationary contact member 44 (clockwise rotation of the rotor of the transmitter 29 having been assumed). This completes an energizing circuit for the solenoids 45 which in response to energization attract and hold the armature 26a so that the rocker arm 26 is held in the maximum speed position irrespective of the heart cam 47 which is kept in continuous rotation by the rotation of the rotor of receiver 28 as long as the speed of the pilot device is greater than the maximum speed at which the motor 13 can drive the driven object. The amount of rotation of the rotor of receiver 30 and cam 52 necessary to cause movable contact member 42 to engage either of its cooperating stationary contacts may be any desired amount, for example, two and one-half degrees. Since the speed ratio between the rotors of receivers 28 and 30 is 36:1, it will be noted that two and one-half degrees movement of the rotor of receiver 30 and cam 52 from their initial positions corresponds to 90 degrees rotation of the rotor of receiver 28 and cam 47 from their initial positions.

If the pilot device 11 is decelerated and stopped, the movable contact member 42 will remain in engagement with stationary contact member 44 until motor 13 has driven object 10 to within two and one-half degrees of correspondence with the pilot device, or in other words, until the rotor of receiver 30 and cam 52 approach to within two and one-half degrees of their initial positions. At this point the rotor of the high speed receiver 28 and cam 47 will be within 90 degrees of their initial positions. When the movable contact member 42 breaks contact with the stationary member 44, the rocker arm 26 will be rotated from its original position by the heart cam 47. The stator member of high speed receiver 28 is driven by motor 13 an amount sufficient to rotate the rotor member of receiver 28 and cam 47 to their initial positions, and at this point the object 10 will be in correspondence with the pilot device 11. As thus far described, power would be kept on the motor 13 until the instant that the object 10 reached correspondence with the pilot device. If this were actually the case, the stored energy of the motor 13 and the object 10 would cause the object 10 to overshoot the position of correspondence and the control would then be actuated in the reverse direction to return the object 10 to a position of correspondence with the pilot device. But again power would be kept on the motor 13 until the object 10 reached correspondence with the pilot device, and this would cause the object 10 to overshoot in the reverse direction. As a result continuous oscillation or hunting would be set up and the object 10 would not come to rest in correspondence with the pilot device.

However, this continuous oscillation or hunting is prevented by the anti-hunting reactor network 55, 56 in the manner set forth in the description of the anti-hunting network.

In the modification of Fig. 2, the direct-current electric motor 64 serves to drive the driven object and is supplied from an armature excited dynamo-electric machine 65. Motor 64 and machine 65 of Fig. 2 correspond in structure and function to motor 13 and machine 14 of Fig. 1. The modified system of Fig. 2 differs from the system of Fig. 1 primarily in that the control field winding 65a of the armature excited machine 65 which supplies motor 64 is supplied from an armature excited dynamo-electric machine 66 instead of from an amplifier such as the bridge 18 or other suitable form of amplifier. The armature excited dynamoelectric machine 66 is smaller in size than the machine 65 and the machine 14 of Fig. 1 but in all other respects it is identical with these machines, and a repetition of the description is therefore unnecessary. The control field winding 66a of the exciter 66 may be supplied from a suitable amplifier such as the resistance bridge 18 of Fig. 1 or may be supplied through suitable rectifying means from the voltage of the rotor of the receiving device.

The operation of this modified system is so similar to the operation of the system of Fig. 1 as to be readily understood without further explanation.

In the modified system of Fig. 3, the direct-current electric motor 67 serves to drive an object (not shown) in correspondence with the pilot device 68. Motor 67 is supplied from an armature excited dynamo-electric machine 69. Dynamo-electric machine 69 is in all respects identical with armature excited dynamo-electric machine 14 of the system of Fig. 1, and accordingly, a repetition of the description is omitted.

The modified system of Fig. 3 differs from the system of Fig. 1 primarily in that an electric valve type amplifier 70 is utilized instead of the resistance bridge 18 to supply the control current to the control field winding 69a of armature excited dynamo-electric machine 69.

Electric valve apparatus 70 comprises two pair of valves 71 and 72. Each pair of valves is connected for full-wave rectification, and has its output circuit connected to the control field winding 69a of machine 69. The pair of valves 71 when energized, supplies current to the field winding 69a in one direction, and the other pair of valves 72 when energized, supplies current in the reverse direction, and thus, when either pair of valves is energized, the armature excited dynamo-electric machine 69 supplies current in one direction or the other to the follow-up motor 67 and the motor 67 rotates in a corresponding direction.

For the purpose of controlling the energization of the electric valve apparatus 70, suitable rotary induction apparatus is provided. This rotary induction apparatus is similar to the electrical motion transmitting and receiving apparatus of the system of Fig. 1. It comprises a transmitting device 73 and a receiving device 74. Transmitting device 73 has a rotor member 73a provided with a single-phase winding (not shown) and a stator member having a three-element winding (not shown) that is physically similar to a distributed three-phase winding. The receiver 74 is identical with the transmitter. As shown, the rotor winding of the transmitter is connected to the upper and middle supply lines of the three-phase source 75, and the stator windings of devices 73 and 74 are connected together by means of conductors 76. The rotor winding of the receiver 74 is connected through the grid transformer 77 to the grid or input circuit of the electric valve apparatus. The rotor member 73a of the transmitter is connected through suitable driving connections to the pilot device illustrated as a handle 68 but which may be any other suitable control device as explained in connection with the system of Fig. 1, and the rotor member of the receiver 74 is connected through gearing 78 to the shaft of the follow-up motor 67.

When the pilot device 68 and the shaft of the follow-up motor 67 are in positions of correspondence, no voltage is supplied through the transmitter 73 and the receiver 74 to the grid or input circuit of the electric valve apparatus 70. As a result, the valve apparatus is deenergized and the armature excited dynamo-electric machine 69 is not excited and supplies no current to the armature of the follow-up motor 67 which is at rest. When the pilot device 68 is rotated in either direction, a voltage is supplied to the grid circuit of the electric valve apparatus which energizes one or the other of the pairs of valves, depending upon the direction of rotation of the pilot device. This causes the valve apparatus to supply a control current in one direction or the other through the control field winding 69a which, in turn, causes the armature excited dynamo-electric machine 69 to supply a current in one direction or the other to the armature of the follow-up motor 67, depending upon the direction of rotation of the pilot device 68. This causes the motor 67 to rotate in a corresponding direction, thereby rotating the rotor member of the receiver 74 toward a position of correspondence with the rotor of the transmitter 73. When this position of correspondence is reached, no voltage is supplied to the grid circuit of the electric valve apparatus through the transformer 77, and consequently, the electric valve apparatus is deenergized and the motor 67 comes to rest.

In order to prevent oscillations or hunting, means similar to the saturable reactor network 55, 56 of Fig. 1 may be employed.

Although in accordance with the provisions of the patent statutes, this invention is described as embodied in concrete form and the principle of the invention has been explained together with the best mode in which it is now contemplated applying that principle, it will be understood that the apparatus and connections shown and described are merely illustrative and that the invention is not limited thereto, since alterations and modifications will readily suggest themselves to persons skilled in the art without departing from the true spirit of this invention or from the scope of the annexed claims.

What we claim as new and desire to secure by Letters Patent of the United States is:

1. A follow-up system comprising a pilot device, a driven object, a direct-current electric motor for driving said object, a dynamo-electric machine connected to said motor, means responsive to positional disagreement of said pilot device and driven object for controlling said machine to supply current to said motor to cause said motor to drive said object toward correspondence with said pilot device, and means for reducing the inductance of the motor circuit so that the lag of the current of said circuit with respect to the voltage is counteracted by the phase advance of said current produced by said motor at the natural period of oscillation of said motor.

2. In a follow-up control system for controlling an object to reproduce the movements of a pilot device, a direct-current electric motor for driving said object, a dynamo-electric amplifier connected to said motor, means responsive to positional disagreement of said pilot device and object for controlling said amplifier to supply current to said motor to cause said motor to drive said object toward correspondence with said pilot device, and compensating means for counteracting the tendency of the current of the motor circuit to lag behind the voltage of said amplifier.

3. A follow-up control system comprising in combination, a pilot device, a driven object, means responsive to positional disagreement of said pilot device and driven object for producing a force to restore said object to correspondence with said pilot device comprising a plurality of stages of amplification between said pilot device and driven object for amplifying the force moving said pilot device, a dynamo-electric amplifier in one of said stages and means in each of said stages for correcting the tendency of the output of each of said stages to become lagging with respect to the input.

4. In a follow-up control system for driving an object into positional agreement with a pilot device, the combination with a direct-current electric motor for driving said object, of a dynamo-electric amplifier for controlling the supply of current to said motor, means responsive to positional disagreement of said pilot device and driven object for controlling said amplifier thereby to cause said motor to drive said object toward correspondence with said pilot device, and compensating means for decreasing the inductance of the motor circuit so that the kinetic energy of said motor and its load during a free oscillation started by an external force equals or exceeds the magnetic stored energy of said circuit.

5. In a follow-up control system having a pilot device and driven object, the combination with a direct-current electric motor for driving said object, of an armature excited dynamo-electric amplifier for supplying current to said motor, said amplifier being provided with a control field winding, means responsive to positional disagreement of said pilot device and driven object for impressing a voltage on said field winding thereby to cause said motor to drive said object toward correspondence with said pilot device, and a reactive shunt connected to said field winding for advancing the phase of the current of said winding with respect to said voltage.

6. In a follow-up control system having a pilot device and driven object, the combination with a direct-current electric motor for driving said object, of an armature excited dynamo-electric machine for controlling the supply of current to said motor, said machine having a pair of short-circuited brushes and a pair of load brushes on an axis at an angle with the short-circuited brush axis, and having a control field winding and a compensating field winding, and means responsive to positional disagreement of said pilot device and driven object for supplying a control voltage to said control field winding thereby to cause said motor to drive said object toward correspondence with said pilot device.

7. In a follow-up control system having a pilot device and driven object, the combination with a direct-current electric motor for driving said object, of an armature excited dynamo-electric machine for supplying current to said motor, said machine having a control field winding, a pair of load brushes connected to said motor and arranged to commutate on said control axis, a pair of short-circuited brushes arranged to commutate on an axis at an angle with said control axis, and a series compensating field winding on said control axis having ampere turns equal to between 75 per cent and 125 per cent of the armature ampere turns, and means responsive to positional disagreement of said pilot device and driven object for supplying current to said control winding thereby to cause said motor to drive said object toward correspondence with said pilot device.

8. In a follow-up control system having a pilot device and driven object, the combination with a direct-current motor for driving said object, of an armature excited dynamo-electric machine having a control field winding, a pair of load brushes arranged to commutate on the axis of said winding and connected to supply current to said motor and a pair of short-circuited brushes arranged to commutate on an axis at an angle with said control axis, a shunt field winding on said short-circuited brush axis and a reactance device connected in the circuit of said shunt field winding, and means responsive to positional disagreement of said pilot device and driven object for supplying a control current to said control winding thereby to cause said motor to drive said object toward correspondence with said pilot device.

9. In a follow-up control system having a pilot device and driven object, a direct-current motor for driving said object, a first armature excited dynamo-electric machine provided with a control field winding, a pair of load brushes arranged to commutate on the axis of said winding and connected to supply current to said motor, a pair of short-circuited brushes arranged to commutate on an axis at an angle with said control axis, and a series compensating field winding arranged on said control axis, a second armature excited dynamo-electric machine similar to said first machine and having its load brushes connected to said control winding, and means responsive to positional disagreement of said pilot device and driven object for supplying a control current to the control winding of said second machine thereby to cause said motor to drive said object toward correspondence with said pilot device.

10. In a follow-up control system having a pilot device and driven object, a direct-current electric motor for driving said object, a dynamo-electric machine having a control field winding, a pair of load brushes arranged to commutate on the axis of said control winding and connected to supply current to said motor, a pair of short-circuited brushes arranged to commutate on an axis at an angle with said control axis, electric valve apparatus connected to said control winding, and means responsive to positional disagreement of said pilot device and driven object for energizing said valve apparatus to supply a control current to said control winding thereby to cause said motor to drive said object toward correspondence with said pilot device.

11. In a follow-up control system having a pilot device and driven object, the combination with a direct-current motor for driving said object, of an armature excited dynamo-electric machine having a control winding and a pair of load brushes arranged to commutate on the axis of said winding and connected to supply current to said motor, a pair of short-circuited brushes arranged to commutate on an axis at an angle with said control axis and a series field winding for compensating armature reaction on said control axis, electric valve apparatus for supplying a control current to said control winding, and means responsive to positional disagreement of said pilot device and driven object for controlling said valve apparatus to supply current to said control winding of a polarity depending upon the relative positions of said device and object thereby to cause said motor to drive said object toward correspondence with said pilot device.

12. In a follow-up control system having a pilot device and driven object, the combination with a direct-current electric motor for driving said object, of an armature excited dynamo-electric machine having a control field winding, a pair of load brushes arranged to commutate on the axis of said field winding, a pair of short-circuited brushes arranged to commutate on an axis at an angle with said control axis and a shunt field winding on said short-circuited brush axis, electric valve apparatus for supplying a control current to said field winding, means responsive to positional disagreement of said pilot device and driven object for energizing said valve apparatus to impress a voltage on said control field winding to cause said motor to drive said object toward correspondence with said pilot device, a reactive shunt connected to said control field winding for advancing the phase of the current in said field winding with respect to said voltage, and a reactance device connected in circuit with said shunt field winding for reducing the coupling between said shunt field winding and the armature of said machine.

13. In a follow-up control system having a pilot device and a driven object, the combination with a direct-current electric motor for driving said object, of an armature excited dynamo-electric machine having a control field winding, a pair of load brushes arranged to commutate on the axis of said control winding, a pair of short-circuited brushes arranged to commutate on an axis at an angle with said control axis, a series winding for compensating armature reaction along said control axis and a shunt field winding arranged on said short-circuited axis, means responsive to positional disagreement of said pilot device and driven object for impressing a control voltage on said control winding thereby to cause said motor to drive said object toward correspondence with said pilot device, and means for advancing the phase of the current of said control winding with respect to said voltage comprising an inductive reactance connected in shunt with said control field winding, and an inductive reactance connected in series relationship with said shunt field winding for minimizing the coupling between said shunt field winding and the armature winding of said machine.

ERNST F. W. ALEXANDERSON.
MARTIN A. EDWARDS.
KENNETH K. BOWMAN.